United States Patent Office 3,033,752
Patented May 8, 1962

3,033,752
THERAPEUTIC COMPOSITIONS CONTAINING 17α-METHYL-4,6-ANDROSTADIEN-17β-OL-3-ONE
Raymond O. Clinton and Robert G. Christiansen, Schodack, N.Y., assignors to Sterling Drug Inc., New York, N.Y., a corporation of Delaware
No Drawing. Filed Oct. 17, 1958, Ser. No. 767,766
4 Claims. (Cl. 167—74)

This invention relates to the preparation of steroid 4,6-dienes, and in particular it relates to the preparation of 17α-lower-alkyl-17β-R′O-4,6-androstadien-3-ones having the formula

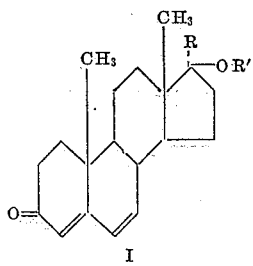

wherein R is a lower-alkyl group, and R′ is selected from the group consisting of hydrogen and acyloxy groups. The invention also relates to intermediates in the preparation of compounds of Formula I, and to hormonal compositions containing the species of Formula I wherein R is methyl ($CH_3$) and R′ is hydrogen (H).

In the above general Formula I the group R represents a lower-alkyl group, preferably one having from one to about nine carbon atoms which can be straight or branched, thus including such groups as methyl, ethyl, propyl, isopropyl, butyl, isobutyl, secondary-butyl, tertiary-butyl, pentyl, hexyl, isohexyl, heptyl, octyl, nonyl, and the like.

In the above general formula the group R′ represents a hydrogen atom or an acyl group. The acyl group is preferably one derived from a hydrocarbon carboxylic acid having from one to about nine carbon atoms, thus including acyl groups derived from lower-alkanoic acids, monocyclic cycloalkanecarboxylic acids, cycloalkyl substituted lower-alkanoic acids, monocyclic aromatic acids, aryl-alkanoic acids, and the like. Thus R′ can include such groups as formyl, acetyl, propionyl, butyryl, caproyl, octanoyl, cyclohexaneformyl, cyclohexylacetyl, cyclohexylpropionyl, cyclopentylpropionyl, benzoyl, phenylacetyl, and the like. A particularly preferred class of acyl groups is the class of lower-alkanoyl radicals having from one to about nine carbon atoms.

The preparation of the compounds of Formula I is illustrated by the following reaction:

A 17α-lower-alkyl-17β-R′O-4-androsten-3-one (II) is halogenated in the 6 position with an N-halo compound, followed by dehydrohalogenation of the resulting 6-halo derivative (III) by heating with a base (the halogen can be chlorine or bromine, preferably bromine):

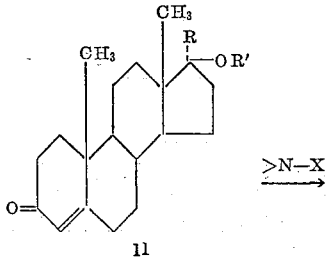

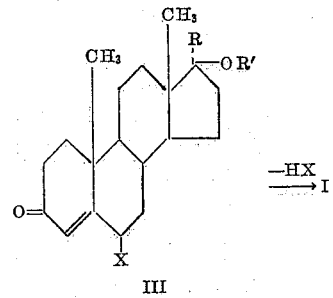

The starting materials of Formula II belong to generally known classes of compounds. They are readily prepared from dehydroepiandrosterone; for instance, a reaction between the latter and a lower-alkyl-magnesium halide or a lower-alkyl-lithium, and oxidation of the 3-hydroxy group with such agents as chromic oxide or aluminum tertiary-butoxide gives the 3-keto-$\Delta^4$-compounds of Formula II.

If compounds wherein R′ is an acyl group are desired, the esterification of the 17β-hydroxy group can be effected either before the halogenation and dehydrohalogenation reactions are carried out or upon the final diene product. It is generally preferred to carry out the esterification on the starting material since the starting material is less susceptible to deleterious side-reactions than the diene product. The esterification is carried out by heating the 17β-hydroxy compound with the appropriate acid, acid anhydride or acid halide, usually in the presence of an organic basic medium such as pyridine.

In the halogenation step the N-halo compound can be any such compound which will halogenate an olefinic compound in the allyl position. The preferred halogenating agents are N-bromoamides or N-bromoimides, such as N-bromosuccinimide, N-bromoacetamide, N-bromophthalimide, N-bromohydantoin, and the like. A compound of Formula II is heated with at least a molar equivalent amount of the N-bromo compound in an organic medium inert under the conditions of the reaction, such as chloroform, carbon tetrachloride, petroleum ether, and the like. The reaction is preferably carried out at a temperature between about 50° and 120° C.

The dehydrohalogenation step is effected by heating the 6-halo derivative (III) with a base or acid-aceptor capable of splitting out the elements of hydrogen halide from secondary halides. Such bases include alkali metal hydroxides and alkoxides, and organic amines. If alkali metal hydroxides or alkoxides are used, the reaction is carried out in an inert medium, aqueous or non-aqueous. A preferred class of dehydrohalogenating agents are relatively high-boiling, liquid tertiary-amines, such as the alkylated pyridines, e.g., picolines, lutidines, collidines; quinoline, and the like, or mixtures thereof. In this case the amine itself serves as the reaction medium. The dehydrohalogenation with a tertiary-amine takes place at a temperature between about 100° and 250° C., and is most conveniently carried out at the boiling point of the amine. It is not necessary to purify the 6-halo compound prior to dehydrohalogenation.

The following examples will illustrate the invention more fully without limiting the same thereto.

EXAMPLE 1

(a) 6-bromo-17α-methyl-4-androsten-17β-ol-3-one (III; X is Br, R is $CH_3$, R′ is H):

17α-methyl-4-androsten-17β-ol-3-one (9.06 g., 0.0300 mole) was dissolved in 300 ml. of carbon tetrachloride, and 50 ml. of the carbon tetrachloride was distilled off to insure dryness. The solution was cooled somewhat, 5.61 g. (0.0315 mole) of N-bromosuccinimide was added, and the mixture was refluxed for forty-five minutes. The reaction mixture was filtered while hot, the succinimide on the filter was washed with 100 ml. of hot chloroform, and the combined filtrate and washings were concentrated to dryness in vacuo. Some n-hexane was added to the residue and then concentrated to dryness in vacuo to remove any residual carbon tetrachloride. The residue was triturated with n-hexane, and the solid product was collected by filtration and recrystallized from 700 ml. of ether. A first crop of product was obtained amounting to 1.63 g., M.P. 135–136° C. Additional crops of product were obtained by concentrating the mother liquors, giving an additional 7.63 g. of 6-bromo-17α-methyl-4-androsten-17β-ol-3-one, M.P. 112–124° C. The first crop was analyzed with the following results.

*Analysis.*—Calcd. for $C_{20}H_{29}BrO_2$: C, 62.99; H, 7.67; Br. 20.96. Found: C, 63.18; H, 7.53; Br, 21.78.

By substitution in the foregoing preparation of the 17α-methyl-4-androsten-17β-ol-3-one by a molar equivalent amount of 17α-ethyl-4-androsten-17β-ol-3-one,
17α-propyl-4-androsten-17β-ol-3-one,
17α-isopropyl-4-androsten-17β-ol-3-one,
17α-butyl-4-androsten-17β-ol-3-one,
17α-isobutyl-4-androsten-17β-ol-3-one,
17α-hexyl-4-androsten-17β-ol-3-one,
17α-nonyl-4-androsten-17β-ol-3-one,
17α-methyl-17β-formyloxy-4-androsten-3-one,
17α-methyl-17β-propionoxy-4-androsten-3-one,
17α-methyl-17β-caproyloxy-4-androsten-3-one,
17α-methyl-17β-nonanoyloxy-4-androsten-3-one,
17α-methyl-17β-(β-cyclohexylpropionoxy)-4-androsten-3-one, or
17α-methyl-17β-benzoyloxy-4-androsten-3-one, there can be obtained, respectively, 6-bromo-17α-ethyl-4-androsten-17β-ol-3-one,
6-bromo-17α-propyl-4-androsten-17β-ol-3-one,
6-bromo-17α-isopropyl-4-androsten-17β-ol-3-one,
6-bromo-17α-butyl-4-androsten-17β-ol-3-one,
6-bromo-17α-isobutyl-4-androsten-17β-ol-3-one,
6-bromo-17α-hexyl-4-androsten-17β-ol-3-one
6-bromo-17α-nonyl-4-androsten-17β-ol-3-one,
6-bromo-17α-methyl-17β-formyloxy-4-androsten-3-one,
6-bromo-17α-methyl-17β-propionoxy-4-androsten-3-one,
6-bromo-17α-methyl-17β-caproyloxy-4-androsten-3-one,
6-bromo-17α-methyl-17β-nonanoyloxy-4-androsten-3-one,
6-bromo-17α-methyl-17β-(β-cyclohexylpropionoxy)-4-androsten-3-one, or
6-bromo-17α-methyl-17β-benzoyloxy-4-androsten-3-one.

(b) 17α-methyl-4,6-androstadien-17β-ol-3-one (I; R is $CH_3$, R' is H):

A mixture of 6.85 g. of 6-bromo-17α-methyl-4-androsten-17β-ol-3-one and 50 ml. of freshly distilled gamma-collidine was refluxed for forty-five minutes. The reaction mixture was cooled to room temperature and poured into 400 ml. of water containing cracked ice and 25 ml. of concentrated sulfuric acid. The yellow-orange solid which formed was collected by filtration, washed with water and dried at 50° C., giving 4.92 g., M.P. 179–183° C. (dec.). The latter material was dissolved in 400 ml. of benzene and chromatographed on a column of 200 g. of aluminum oxide. The product was eluted with sixteen 400 ml. portions of benzene, five 400 ml. portions of 20% ether in benzene and five 800 ml. portions of ether, which were evaporated to give crystalline fractions melting about 190–196° C. These fractions were combined and recrystallized first from acetone and then from ethyl acetate, giving a sample of 17α-methyl-4,6-androstadien-17β-ol-3-one, M.P. 196–197.5° C. (corr.), $E_{Max}$=25991 at 283 mμ (in ethanol), $$[\alpha]_D^{25} = +36.2° \pm 0.3°$$

(1% in chloroform).

*Analysis.*—Calcd. for $C_{20}H_{28}O_2$: C, 79.95; H, 9.39. Found: C, 79.92; H, 9.49.

By substitution in the foregoing preparation of the 6-bromo-17α-methyl-4-androsten-17β-ol-3-one by a molar equivalent amount of 6-bromo-17α-ethyl-4-androsten-17β-ol-3-one,
6-bromo-17α-propyl-4-androsten-17β-ol-3-one,
6-bromo-17α-isopropyl-4-androsten-17β-ol-3-one,
6-bromo-17α-butyl-4-androsten-17β-ol-3-one,
6-bromo-17α-isobutyl-4-androsten-17β-ol-3-one,
6-bromo-17α-hexyl-4-androsten-17β-ol-3-one,
6-bromo-17α-nonyl-4-androsten-17β-ol-3-one,
6-bromo-17α-methyl-17β-formyloxy-4-androsten-3-one,
6-bromo-17α-methyl-17β-propionoxy-4-androsten-3-one,
6-bromo-17α-methyl-17β-caproyloxy-4-androsten-3-one,
6-bromo-17α-methyl-17β-nonanoyloxy-4-androsten-3-one,
6-bromo-17α-methyl-17β-(β-cyclohexylpropionoxy)-4-androsten-3-one, or
6-bromo-17α-methyl-17β-benzoyloxy-4-androsten-3-one, there can be obtained, respectively, 17α-ethyl-4,6-androstadien-17β-ol-3-one,
17α-propyl-4,6-androstadien-17β-ol-3-one,
17α-isopropyl-4,6-androstadien-17β-ol-3-one,
17α-butyl-4,6-androstadien-17β-ol-3-one,
17α-isobutyl-4,6-androstadien-17β-ol-3-one,
17α-hexyl-4,6-androstadien-17β-ol-3-one,
17α-nonyl-4,6-androstadien-17β-ol-3-one,
17α-methyl-17β-formyloxy-4,6-androstadien-3-one,
17α-methyl-17β-propionoxy-4,6-androstadien-3-one,
17α-methyl-17β-caproyloxy-4,6-androstadien-3-one,
17α-methyl-17β-nonanoyloxy-4,6-androstadien-3-one,
17α-methyl-17β-(β-cyclohexylpropionoxy)-4,6-androstadien-3-one, or
17α-methyl-17β-benzoyloxy-4,6-androstadien-3-one.

EXAMPLE 2

17α-methyl-4,6-androstadien-17β-ol-3-one (without purification of the intermediate 6-bromo derivative):

17α-methyl-4-androsten-17β-ol-3-one (60.49 g., 0.200 mole) and 2500 ml. of carbon tetrachloride were mixed and about 25 ml. of carbon tetrachloride was distilled off to insure dryness. After cooling somewhat, 71.2 g. (0.400 mole) of N-bromo-succinimide was added, and the mixture was refluxed for five hours in the dark (covered with a black cloth). The resulting orange solution, containing suspended solid, was cooled to about 35° C., filtered, and the insoluble succinimide was washed with two 300 ml. portions of warm carbon tetrachloride. The combined filtrate and washings were evaporated to dryness in vacuo using a water bath held below 40° C. To the solid residue of 6-bromo-17α-methyl-4-androsten-17β-ol-3-one was added 300 ml. of n-hexane and the mixture was again evaporated in vacuo. The residue was then mixed with 400 ml. of redistilled gamma-collidine (coal tar collidine, B.P. 161–174° C.) and distilled until the vapor temperature reached 160° C. The reaction mixture was then refluxed for a further twenty minutes at 160–165° C., then cooled and poured into three liters of ice water containing 175 ml. of concentrated sulfuric acid. After mixing well, the semi-crystalline dark brown solid was collected by filtration and thoroughly washed with water. The resulting product was dried at 50° C., dissolved in 700 ml. of boiling acetone, treated with 4 g. of activated charcoal for decolorizing purposes, filtered, and the filtrate evaporated to a volume of 250 ml. for crystallization. After thorough cooling the crystals were collected by filtration, washed with three 20 ml. portions of cold acetone, and recrystallized from acetone, giving 21.82 g. of material melting at 191–195° C., in the form of yellow leaflets. Concentration of the mother liquors to a volume of 75 ml., filtration of the product and recrystallization from acetone gave an additional 6.57 g. of material melting at 191–194° C. A final recrystallization of the total product from acetone gave a total yield of 26.71 of pure 17α-methyl-4,6-androstadien-17β-ol-3-one, M.P. 196–197.5° C. (corr.).

EXAMPLE 3

17α-methyl-17β-propionoxy-4,6,androstadien-3-one (I; R is CH₃, R' is OCCH₂CH₃):

A mixture of 2.10 g. (0.0070 mole) of 17α-methyl-4,6-androstadien-17β-ol-3-one, 4.55 g. (0.035 mole) of propionic anhydride and 25 ml. of pyridine was refluxed for six and one-half hours. The reaction mixture was kept at room temperature for fifteen hours and then poured into ice water containing a small amount of sulfuric acid. The product was extracted with chloroform, the chloroform extracts were washed with saturated sodium carbonate solution and dried over anhydrous sodium sulfate. The chloroform solution was concentrated to dryness and the residue was crystallized from hexane. The solid material was collected by filtration and proved to be some recovered starting material. The hexane mother liquors upon concentration gave an oil containing 17α-methyl-17β-propionoxy-4,6-androstadien-3-one. The oil was dissolved in n-pentane containing 10% ether and chromatographed on a column of 150 g. of silica gel. The column was eluted successively with 10% ether in n-pentane, 15% ether in n-pentane and 25% ether in n-pentane. The last named solvent mixture brought out crystalline material, which upon two recrystallizations from dilute methanol gave 17α-methyl-17β-propionoxy-4,6-androstadien-3-one in the form of pale yellow leaflets, M.P. 77–88° C.

EXAMPLE 4

17α - methyl - 17β - acetoxy - 4,6 - androstadien - 3 - one (I; R is CH₃, R' is OCCH₃):

A mixture of 10.27 g. (0.0298 mole) of 17α-methyl-17β-acetoxy-4-androsten-3-one and 5.36 g. (0.0301 mole) of N-bromo-succinimide in 300 ml. of carbon tetrachloride was refluxed for one and one-half hours. The reaction mixture was cooled to room temperature, and the succinimide was removed by filtration and washed with carbon tetrachloride. The combined filtrate and washings were concentrated to dryness in vacuo at 35–40° C. and then held in vacuo for one and one-half hours at room temperature to remove residual solvent. The residue containing 6-bromo-17α-methyl-17β-acetoxy-4-androsten-3-one was dissolved in 40 ml. of 2,4-lutidine and 40 ml. of gamma-collidine and the solution was refluxed for one hour. The solution was cooled and poured into ice water containing 40 ml. of concentrated sulfuric acid. The product was extracted with methylene dichloride, and the extracts were washed with dilute sulfuric acid, water, and dilute sodium bicarbonate solution, and dried over anhydrous sodium sulfate. The methylene dichloride solution was concentrated to dryness, the residue was dissolved in 100 ml. of hot n-hexane, 400 ml. of n-pentane was added, and the solution was chromatographed on a column of 300 g. of silicon dioxide pre-wet with n-pentane. The remaining residue which failed to dissolve in the n-hexane was further extracted with n-hexane, n-pentane added, and the solution added to the column. The column was eluted successively with n-pentane, and n-pentane containing gradually increasing proportions of ether. The eluates from n-pentane containing 20–30% ether upon concentration gave crystalline material, combined weight 7.12 g., M.P. 125–144° C. The latter product was dissolved in 300 ml. of boiling n-hexane, filtered while hot, and the solution concentrated to a volume of 75 ml. and cooled. The product which crystallized was collected by filtration, washed with cold n-hexane, dried at 70° C. and recrystallized twice from methanol, giving 17α - methyl-17β-acetoxy-4,6-androstadien-3-one in the form of pale yellow needles, M.P. 148–150° C. The analytic sample was dried for eight hours at 100° C. in vacuo and had a corrected melting point 149.5–152.5° C., $[\alpha]_D^{25} = +45°$ (1% in chloroform), $E_{max} = 26630$ at 284 mμ (in ethanol).

*Analysis.*—Calcd. for $C_{22}H_{30}O_3$: C, 77.15; H, 8.83. Found: C, 77.25; H, 8.91.

EXAMPLE 5

17α - ethyl - 4,6 - androstadien - 17β - ol - 3 - one (I; R is CH₂CH₃, R' is H):

A mixture of 10.02 g. (0.0317 mole) of 17α-ethyl-4-androsten-17β-ol-3-one and 5.76 g. (0.0317 mole) of N-bromo-succinimide in 200 ml. of carbon tetrachloride was refluxed for forty minutes. The reaction mixture was cooled, filtered, and the filtrate concentrated in vacuo below 50° C. n-Hexane was added to the residue and evaporated at 30° C. in vacuo. The residue (12.5 g.) of crude 6 - bromo - 17α - ethyl - 4 - androsten - 17β - ol-3-one and 100 ml. of gamma-collidine was refluxed for one hour. The reaction mixture was cooled and added to 1 liter of ice water containing 50 ml. of concentrated sulfuric acid. The precipitate which formed was collected by filtration and the filtrate extracted with ether. The precipitate was dissolved in the ether extracts and the solution was washed with dilute sulfuric acid, water, and sodium carbonate solution, and dried over anhydrous sodium sulfate. The ether solution was concentrated to a small volume, and the crystalline material which separated was collected and recrystallized successively from an ethyl acetate-ether mixture, a benzene-ether mixture, and ethanol, and dried at 100° C. in vacuo for six hours, giving 17α-ethyl-4,6-androstadien-17β - ol - 13 - one, M.P. 177.5–182° C. (corr.), $[\alpha]_D^{23} = +14.9°$ (1% in chloroform), $E_{max} = 26260$ at 285 mμ (in 95% ethanol).

*Analysis.*—Calcd. for $C_{21}H_{30}O_2$: C, 80.21; H, 9.62. Found: C, 80.55; H, 9.79.

Additional product was obtained from the mother liquors by concentrating them, and chromatographing an n-pentane solution of the residue on a column of magnesium silicate. The column was eluted with n-pentane containing gradually increasing amounts of methylene dichloride up to 50%, and then with n-pentane containing gradually increasing amounts of ether. The desired product was brought out with n-pentane containing 5 to 40% ether.

The compounds of Formula I possess useful hormonal activities; for example, anabolic, myotrophic, androgenic and pituitary inhibiting properties. Of especial advantage is 17α - methyl - 4,6 - androstadien - 17β - ol - 3 - one, which has been found to have an anabolic activity one-third that of testosterone propionate in effecting nitrogen retention while being devoid of androgenic or estrogenic activity. Surprisingly, the next higher homolog, 17α-ethyl-4,6-androstadien-17β-ol-3-one has been found to be essentially devoid of anabolic activity. 17α-methyl-4,6-androstadien-17β-ol-3-one has also been found to have a greater anti-catabolic effect than testosterone propionate in reversing cortisone-induced growth suppression.

The compositions of our invention are therapeutic hormonal compositions comprising, as an essential ingredient thereof, 17α-methyl - 4,6 - androstadien - 17β-ol - 3-one in amount sufficient to impart to said composition anabolic and anti-catabolic properties devoid of any appreciable degree of sex hormonal properties, and a therapeutically acceptable vehicle.

In the foregoing compositions the amount of active steroid ingredient can vary from about 0.1 percent to about 50 percent by weight relative to the total weight of the composition. A preferred range of steroid content ranges from about 1 percent to about 30 percent. The lower amounts of steroid, 1–5 percent, are employed in compositions for topical application; higher amounts, 15–30 percent, in compositions for oral administration; and intermediate amounts, 2–15 percent, in compositions for parenteral administration.

The nature of the therapeutically acceptable vehicle can vary widely, depending upon the intended route of administration. If the composition is to be administered parenterally by injection, the vehicle can be an aqueous solution of a surfactant or thickening agent in which the steroid in finely divided form produces a stable suspension. Other ingredients may be present if desired, such as sodium chloride to make the solution isotonic, buffers to control pH, germicidal agents, and so forth. Alternatively, parenterally injectable aqueous suspensions can be prepared by poising the finely divided steroid in an aqueous solution of a water-soluble, non-toxic, highly iodinated organic compound such as is commonly used in urography, said solution having a density approximately the same as that of the suspended solid.

Non-aqueous compositions for intramuscular injection can be prepared by dissolving or suspending the steroid in a therapeutically acceptable oil such as peanut oil, cottonseed oil, olive oil, and the like. Other non-aqueous solvents which can be employed are dimethylformamide, dimethylacetamide, absolute ethanol, and dodecyl alcohol.

If the composition is to be administered orally, the composition can be in tablet form with conventional solid excipients such as starch, talc, lactose, and the like. Alternatively, the steroid can be dissolved or suspended in a therapeutically acceptable oil and placed in soft gelatin solutions containing about 25 mg. of steroid per capsule.

If the composition is to be administered topically, it can be formulated as an ointment or cream using conventional ointment bases containing, for example, glycols, higher fatty alcohols, petrolatum, and the like.

The following specific compositions will illustrate our invention without the latter being limited thereby.

*(1) 5 percent aqueous suspension for parenteral administration*

| | g. |
|---|---|
| 17α-Methyl-4,6-androstadien-17β-ol-3-one | 50.0 |
| Polyethylene glycol 600 monooleate | 1.84 |
| Phenyl mercuric acetate | 0.018 |
| sodium chloride | 8.28 |
| Pure water—added to give total volume of 1000 ml. | |

Autoclaved at 121° C. for 20 minutes.

*(2) 10 percent aqueous suspension for parenteral administration*

| | g. |
|---|---|
| 17α-methyl-4,6-androstadien-17β-ol-3-one | 100.0 |
| Polyethylene glycol 600 monooleate | 2.0 |
| Phenyl mercuric acetate | 0.0184 |
| Sodium chloride | 0.828 |
| Pure water—added to give total volume of 1000 ml. | |

Tyndallized at 70° C. for one hour on three successive days.

*(3) 10 percent (relative to total volume) poised aqueous suspension for parenteral administration*

| | |
|---|---|
| 17α-methyl-4,6-androstadien-17β-ol-3-one ____g__ | 10.0 |
| 34.15 percent solution of sodium 3,5-diacetamido-2,4,6-triiodobenzoate in water _____ml__ | 100.0 |

*(4) 2 percent oil solution for intramuscular injection*

| | |
|---|---|
| 17α-methyl-4,6-androstadien-17β-ol-3-one ____g__ | 2.0 |
| Benzyl alcohol _____ml__ | 2.0 |
| Absolute ethanol _____ml__ | 15.0 |
| Peanut oil (dried)—added to give total volume of 100.0 ml. | |

*(5) 28.6 percent tablet for oral administration*

| | Per tablet, g. |
|---|---|
| 17α-methyl-4,6-androstadien-17β-ol-3-one | 0.05000 |
| Granulation containing 49% lactose, 49% dibasic calcium phosphate and 2% starch | 0.10575 |
| Starch | 0.01750 |
| Magnesium stearate | 0.00175 |
| Total weight | 0.17500 |

*(6) 1 percent cream for topical application*

| | g. |
|---|---|
| 17α-methyl-4,6-androstadien-17β-ol-3-one | 10.0 |
| Stearyl alcohol | 200.0 |
| White petrolatum | 200.0 |
| Propylene glycol | 120.0 |
| Polyoxyl 40 stearate | 50.0 |
| Methyl p-hydroxybenzoate | 0.25 |
| Propyl p-hydroxybenzoate | 0.15 |
| Purified water | 419.6 |
| Total weight | 1000.0 |

This application is a continuation-in-part of our co-pending application Serial No. 567,721, filed February 27, 1956, now abandoned.

We claim:
1. A therapeutic hormonal composition comprising, as an essential ingredient thereof, 17α-methyl-4,6-androstadien-17β-ol-3-one, and a therapeutically acceptable vehicle, wherein the essential ingredient is present in amount from about 0.1 percent to about 50 percent by weight relative to the total weight of the composition.

2. A therapeutic hormonal composition for topical application comprising, as an essential ingredient thereof, 17α-methyl-4,6-androstadien-17β-ol-3-one, and a therapeutically acceptable ointment base, wherein the essential ingredient is present in amount from about 1 percent to about 5 percent by weight relative to the total weight of the composition.

3. A therapeutic hormonal composition for parenteral administration comprising, as an essential ingredient thereof, 17α-methyl-4,6-androstadien-17β-ol-3-one, and a therapeutically acceptable liquid vehicle, wherein the essential ingredient is present in amount from about 2 percent to about 15 percent by weight relative to the total weight of the composition.

4. A therapeutic hormonal composition for oral administration comprising, as an essential ingredient thereof, 17α-methyl-4,6-androstadien-17β-ol-3-one, and therapeutically acceptable vehicles, wherein the essential ingredient is present in amount from about 15 percent to about 30 percent by weight relative to the total weight of the composition.

References Cited in the file of this patent
UNITED STATES PATENTS

| 2,085,474 | Ruzicka | June 29, 1937 |
| 2,694,079 | Holysz | Nov. 9, 1954 |
| 2,715,640 | Ralls | Aug. 16, 1955 |
| 2,739,974 | Colton | Mar. 27, 1956 |
| 2,837,464 | Nobile | June 3, 1958 |